(12) United States Patent
McCutcheon (10) Patent No.: US 6,990,433 B1
(45) Date of Patent: Jan. 24, 2006

(54) PORTABLE PERFORMANCE BENCHMARK DEVICE FOR COMPUTER SYSTEMS

(75) Inventor: Charles Scott McCutcheon, Austin, TX (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 666 days.

(21) Appl. No.: 10/185,859

(22) Filed: Jun. 27, 2002

(51) Int. Cl.
*G06F 19/00* (2006.01)

(52) U.S. Cl. .................................. 702/186; 324/512

(58) Field of Classification Search ............... 702/186, 702/182–185, 188; 324/512
See application file for complete search history.

(56) References Cited

U.S. PATENT DOCUMENTS 5,819,066 A * 10/1998 Bromberg et al. ........... 707/102
2002/0082966 A1 * 6/2002 O'Brien et al. ............... 705/36

OTHER PUBLICATIONS

Smith, Kathy, "COSBI for Dummies," [online] Jul. 10, 2002, Van's Hardware, 6 pages Retrieved from the Internet: URL:http://www.vanshardware.com/articles/2002/07/020710_COSBI_For_Dummies/020710_COSBI_For_Dummies.htm: [Retrieved on Jul. 24, 2002].

* cited by examiner

*Primary Examiner*—Edward Raymond
(74) *Attorney, Agent, or Firm*—Zagorin O'Brien Graham LLP (57) ABSTRACT

A benchmarking apparatus includes an interface, storage medium containing software instructions that determine and report a performance result of a computer system. The benchmarking apparatus is a handheld device and can be provided to consumers to aid in determining the performance of one or more computer systems, for example, to aid in purchase decisions. The software instructions include a benchmark routine which is loaded onto and executed by the computer system to determine the performance result. The benchmarking apparatus can be removably coupled to a computer system, for example, through a standard computer interface such as a USB port.

48 Claims, 12 Drawing Sheets

PORTABLE PERFORMANCE BENCHMARK DEVICE FOR COMPUTER SYSTEMS

BACKGROUND

1. Field of the Invention

This invention relates to computer systems and more particularly to performance benchmarking of computer systems.

2. Description of the Related Art

When purchasing a computer system, a best performance for the money determination has become a difficult evaluation for most consumers. Previously, when all computer system architectures and all processor architectures were the same, processor speed was a good indicator of computer system performance. Modern computer system architectures and modern processor architectures vary significantly, and thus, processor speed is no longer an accurate indicator of computer system performance.

Benchmarks are software routines used to measure or predict a computer system's performance on specific types of tasks. Typically, benchmarks evaluate a computer system's performance on tasks like productivity, internet accesses, video encoding and image editing, gaming, and computation intensive applications. Other tasks can include integer and floating point mathematical operations, tests of two- or three-dimensional graphical functions, reading/writing/searching within disk files, and memory allocation and access.

A benchmark can either measure a computer system's actual performance on specific tasks or the benchmark can utilize computer system characteristics to predict the computer system's performance. For example, a benchmark can identify the type of processor, processor speed, cache and memory sizes, system bus characteristics, and graphics subsystem characteristics and utilize tables or other data to predict the computer system's expected performance. Benchmarks can be used to compare the performance of one computer system to another computer system, measure the effect of configuration changes and upgrades, or determine if a computer system is performing at its best.

Ideally, consumers can utilize benchmark results in making purchase decisions. Benchmarks are often published in trade magazines or available from computer system manufacturers or component suppliers. However, different benchmark routines in which performance scores are calculated and scaled differently provide significantly different performance results. For example, often computer system manufacturers provide a proprietary benchmark result which can be used to compare computer systems by that manufacturer, but not different manufacturers. In addition, often newer or generic computer systems do not have benchmark results available. Some processor manufacturers provide benchmarks for particular processors, however, computer system characteristics such as bus speed and the graphics subsystems can cause the benchmark results to vary significantly.

Consumers need access to objective independent benchmark results on which to accurately compare a variety of computer systems, for example, prior to making purchasing decisions.

SUMMARY

Accordingly, in one embodiment, a benchmarking apparatus includes an interface, storage medium containing software instructions that determine and report a performance result of a computer system.

In one embodiment, the storage medium is non-removable and the interface is an industry standard computer interface such as a USB port.

In another embodiment, the benchmarking apparatus is a handheld device and can be provided to consumers to aid in determining the performance of one or more computer systems, for example, to aid in purchase decisions. The software instructions include a benchmark routine which is loaded onto and executed by the computer system to determine the performance result.

In another embodiment, to determine the performance result, the software instructions are configured to identify configuration details of the computer system and calculate the performance result using the configuration details.

In another embodiment, to determine the performance result, the software instructions are configured to calculate the performance result based on an amount of time the computer system takes to complete a software routine loaded on the computer system from the benchmarking apparatus.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

A portable benchmark device is introduced to enable consumers to evaluate the performance of a variety of computer systems prior to making purchasing decisions. The portable benchmark device can be used to measure or predict the performance of a computer system and provides, for example, a simple, easily understood and comparable performance result. The consumer can, for example, use the device in a retail store to quickly and accurately compare the performance of several computer systems. The portable benchmark device is a portable, for example, handheld device which can be removably coupled to a computer system, for example, using a universal serial bus (USB) port, and non-intrusively measures or predicts the computer system's performance. The portable benchmark device can present a numerical performance score and/or other information to the consumer, for example, comparisons between other computer systems tested and recommendations.

Figure 1A:
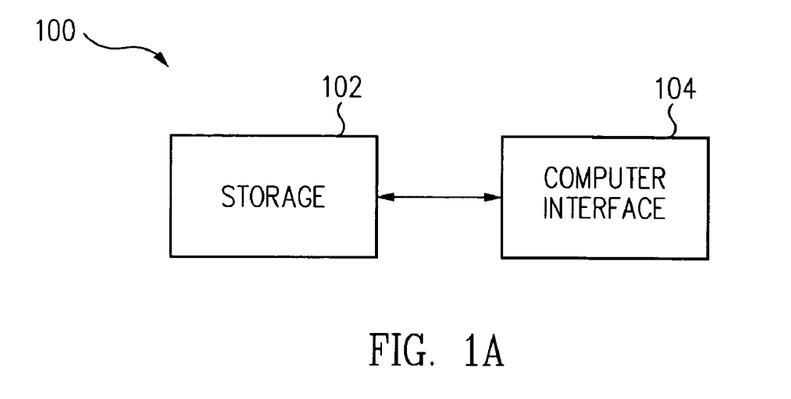
FIGS. 1A–1B illustrate exemplary internal circuit configurations of a portable benchmark device according to various embodiments of the invention.

FIG. 1A illustrates an exemplary internal circuit configuration of a portable benchmark device 100 according to some embodiments of the invention. Portable benchmark device 100 includes a storage medium 102 and a computer interface 104. Storage medium 102 stores, among other things, software instructions to access a computer system through computer interface 104 and measure or predict a computer system's performance utilizing a benchmark routine. Storage medium 102 is non-removable from portable benchmark device 100 and can be, for example, flash memory. In addition, storage medium 102 can be read only or provide write capability. The write capability of storage medium 102 can be used for a variety of purposes, for example, the benchmark routine can be updated or performance results for a variety of computer systems can be stored. Computer interface 104 is utilized for interfacing to a computer system and accessing storage medium 102. Computer interface 104 can include, for example, a flash disk controller which manages the interface between the computer system and flash memory. Computer interface 104 can also include, for example, interface logic to manage data conversion and other functions between a USB port and storage medium 102. For more advanced portable benchmark devices, computer interface 104 can include, for example, a processor. Portable benchmark device 100 typically receives, if needed, power from the computer system and has no other external power source. For example, a USB interface can provide up to 500 milliamps (ma) of power for attached devices such as portable benchmark device 100.

Figure 1B:
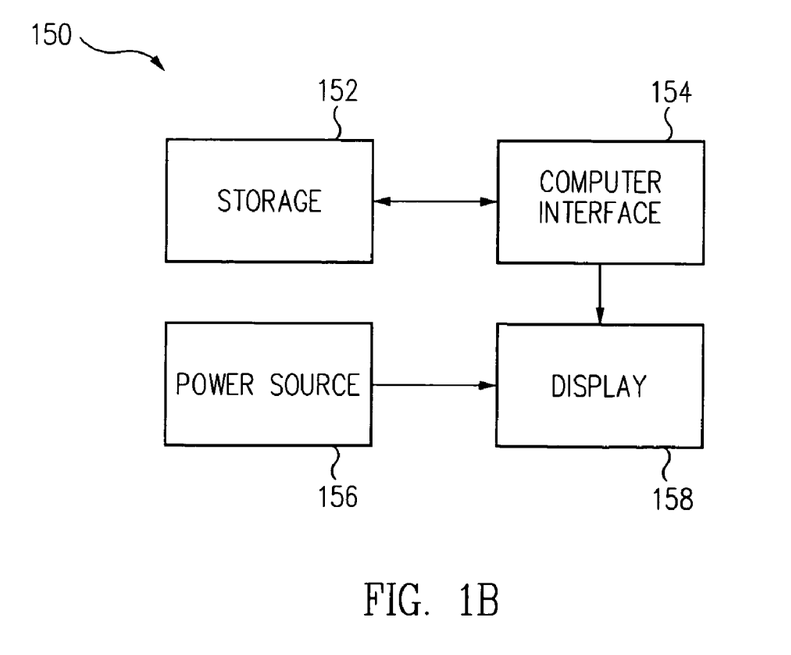

FIG. 1B illustrates another exemplary internal circuit configuration of a portable benchmark device 150 according to an embodiment of the invention. Portable benchmark device 150 includes a storage medium 152 and a computer interface 154, similar to storage medium 102 and computer interface 104 of portable benchmark device 100. Portable benchmark device 150 also includes a power source 156 and a display 158. Power source 156 can be used to power display 158 and can be, for example, a battery, a super capacitor or other such power source. Display 158 can be a light emitting diode (LED), a liquid crystal display (LCD) or other type of display and is utilized for displaying a performance score and/or other information on portable benchmark device 150 visible to a consumer. According to another embodiment of the present invention, power source 156 can be eliminated if the computer system supplies enough power for display 158.

Rather than, or alternatively in addition to, displaying a performance score on a performance benchmark device, a storage medium can contain software instructions to display benchmark results, including a performance score, on a display of the attached computer system. A graphical user interface (GUI) can be used to present results on the display of the computer system.

According to one embodiment of the present invention, upon insertion of the portable benchmark device into (or attachment to) a computer system, an automatically executing routine is initiated. The automatically executing routine contains or calls a performance benchmark routine or other software routines, for example, a GUI, stored on the portable benchmark device.

According to one embodiment of the present invention, the portable benchmark device presents itself to the computer system's operating system as a CD-ROM. Accordingly, the operating system identifies any auto-run files which have standard naming and executes them. Thus, by presenting itself as a CD-ROM, the operating system allows, for example, a portable benchmark device with a USB port to automatically execute a software routine. Any other mechanism to provide the automatic execution capability can be used in accordance with embodiments of the present invention.

In addition to presenting results, a GUI can be used to launch the benchmark routine. For example, a GUI can query a user to initiate a number of operations, including, for example, launch a benchmark routine, review and compare results and performance scores, print results, visit a website, and receive recommendations.

Typical benchmark routines can be utilized by the portable benchmark device to measure or predict the computer system's performance and calculate a performance score. Preferably, a portable benchmark device executes a benchmark routine without any modifications to the computer system. For example, the portable benchmark device does not install software or drivers on the computer system, save information to the computer system's hard disk, modify the system registry, or change start menus. Although software instructions can be loaded onto the computer system from the portable benchmark device, the instructions are "resident" in computer system memory and go away after the device is removed. The processor of the computer system executes the benchmark routine instructions. Performance results are preferably saved to the portable benchmark device. Thus, the computer system is left in same state as before the portable benchmark device was attached.

As described above, benchmark routines can either measure or predict a computer system's performance and present results to a user. Result information can be saved and can have a time and date stamp of the benchmark run date, and can be user named when a GUI is provided.

According to an embodiment of the present invention, a portable benchmark device additionally provides comparisons with the performance results of other tested computer systems and can make recommendations and infer certain information about desired computer systems. For example, a portable benchmark device can recognize that a computer system does not have a 3D graphics card, and indicate that such a card is required for modern gaming, and make a suggestion to buy a new graphics are card or a new computer system. In addition, a portable benchmark device can recognize or infer, for example, that the consumer is mainly interested in gaming and computer systems with advanced graphics and sound based on the types of computer systems tested. Further, a portable benchmark device can include marketing information which can be presented to a consumer.

Some or all of the above described features can be provided in a portable benchmark device. Storage media 102 and 152 can contain multiple software routines and files including, for example, a benchmark routine, performance score and result storage files, recommendation programs, marking and branding information (including html and graphics files) and other data files.

According to one embodiment of the present invention, a portable benchmark device can detect a live internet connection and interactively or automatically update the device and its benchmark routine through the internet. In addition, performance results can be emailed to a consumers email account. Alternatively, the portable benchmark device can be updated through, for example, a kiosk in a retail store.

Figure 2A:
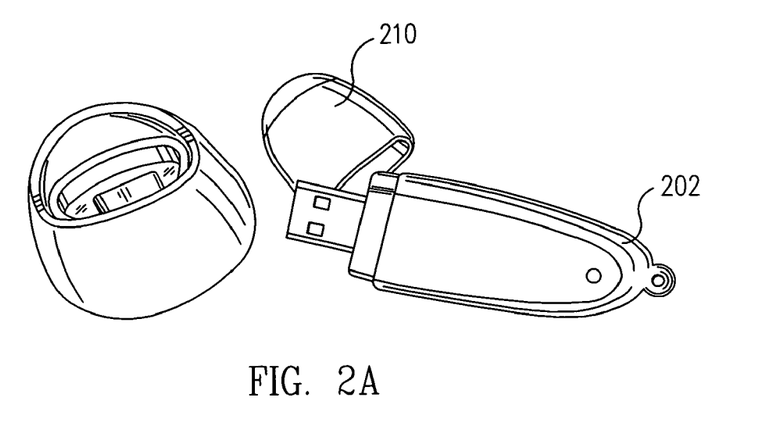
FIGS. 2A–2D illustrate exemplary form factors of a portable benchmark device according to various embodiments of the invention.
Figure 2B:
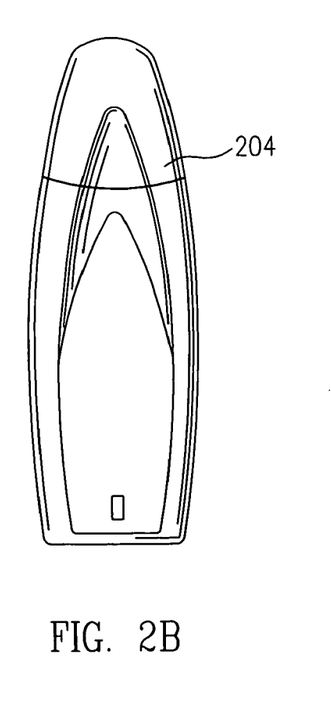
Figure 2C:
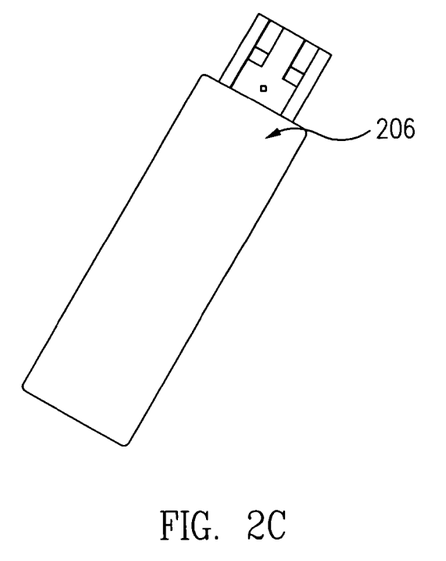
Figure 2D:
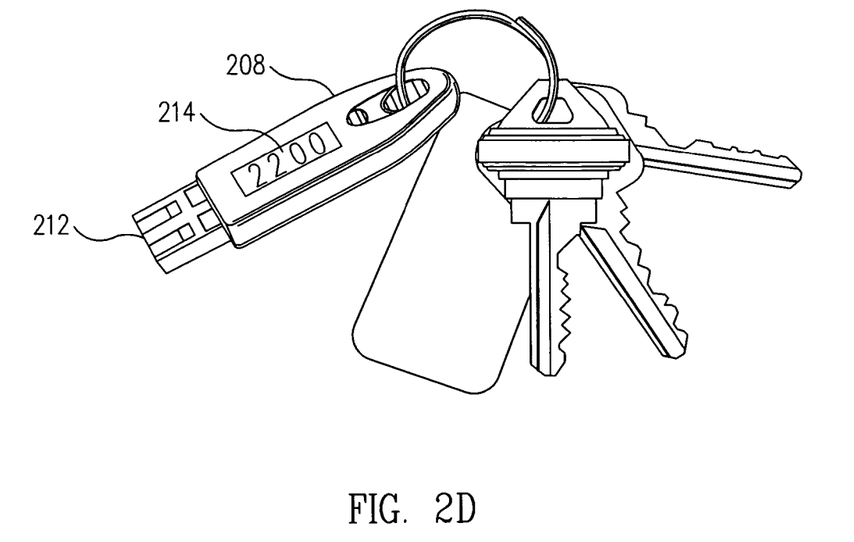

FIGS. 2A–2D illustrate exemplary form factors of a portable benchmark device according to some embodiments of the invention. These form factors are exemplary and not intended to be limiting. As illustrated, each portable benchmark device includes an interface to connect to a computer system non-intrusively, that is, without taking the cover off of a computer system. Thus, the portable benchmark device can test multiple machines in a short period of time and can be utilized in a retail environment to help a consumer make purchasing decisions. As illustrated in FIGS. 2A–2C, a portable benchmark device, such as devices 202, 204, 206 and 208, has a small form factor, can include a cover 210, for example, to protect a USB interface. FIG. 2D illustrates a portable benchmark device 208 that can be carried on a key chain, has a USB interface 212, and a LCD display 214. According to one embodiment, the form factor is lightweight, handheld or pocket-sized, and portable. For example, the form factor can be of similar size and weight as a cigarette lighter, lipstick case, or a pack of gum. Other form factors, sizes and weights of the portable benchmarking device can be implemented in accordance with other embodiments of the invention.

Although FIGS. 2A–2D illustrate portable benchmark devices as having a USB interface, any variety of interfaces can be provided. For example, a portable benchmark device can have a proprietary interface, or an industry standard computer port such as a PCMCIA interface, a serial port interface, a parallel port interface, a USB-2 interface, 1394 or firewire interface. A portable benchmark device can also connect to a computer system using a cable, can be wireless, and the like.

A portable benchmark device is different from a standard USB device or a standard benchmark routine. Although the USB standard provides for auto-detection of a device which identifies the device, a portable benchmark device also has an auto-execute routine that automatically launches a benchmark routine as explained above. Further, standard benchmark routines are not configured to be used by a consumer in a retail environment, for example, to help make a purchase decision. In addition, standard benchmarks are targeted to computer system manufacturers or component suppliers and do not provide comparisons, inferences and recommendations.

Figure 3A:
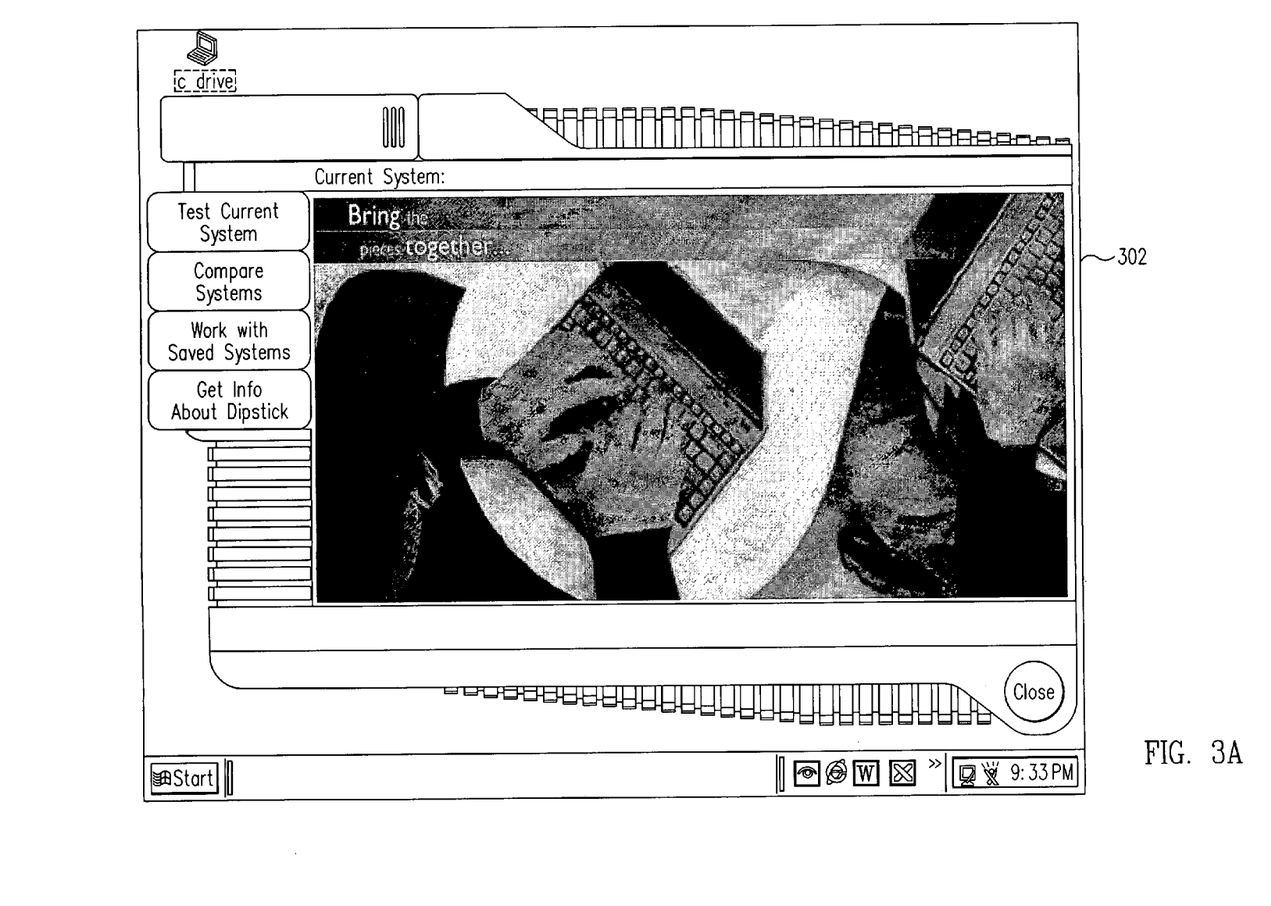
FIGS. 3A–3H illustrate exemplary screen shots of a computer system display according to various embodiments of the invention.
Figure 3B:
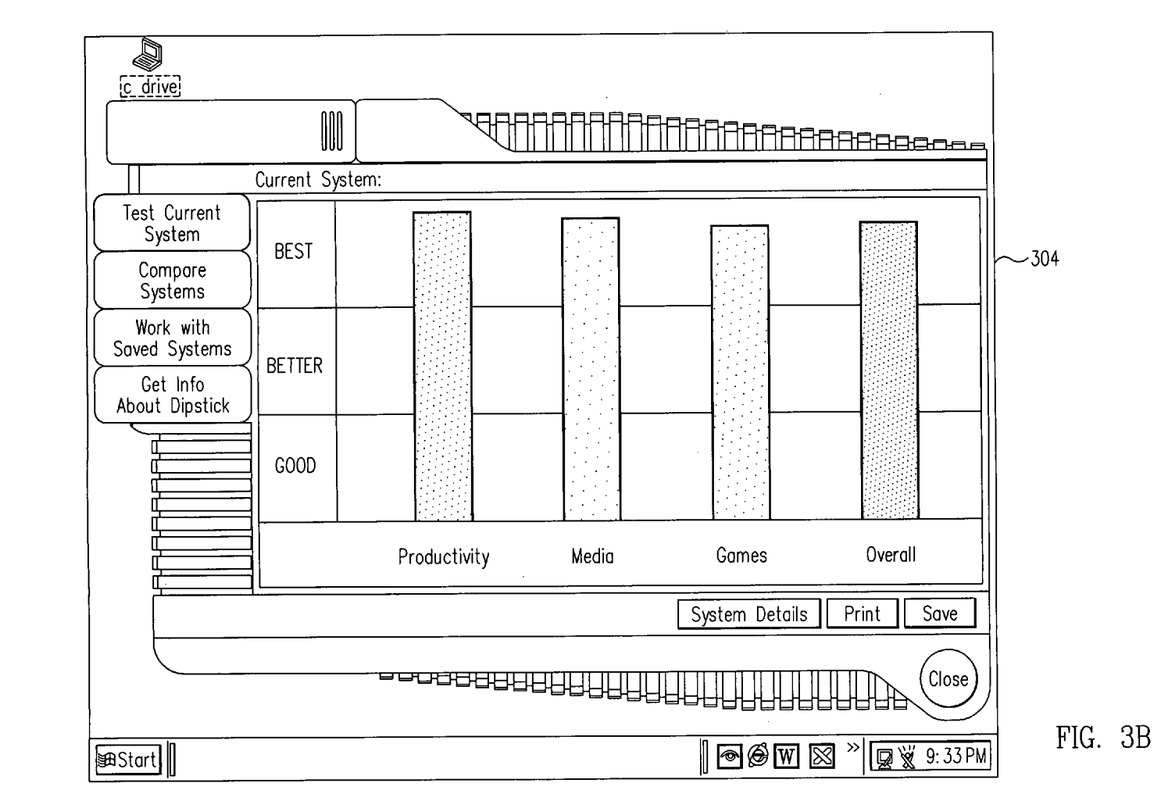
Figure 3C:
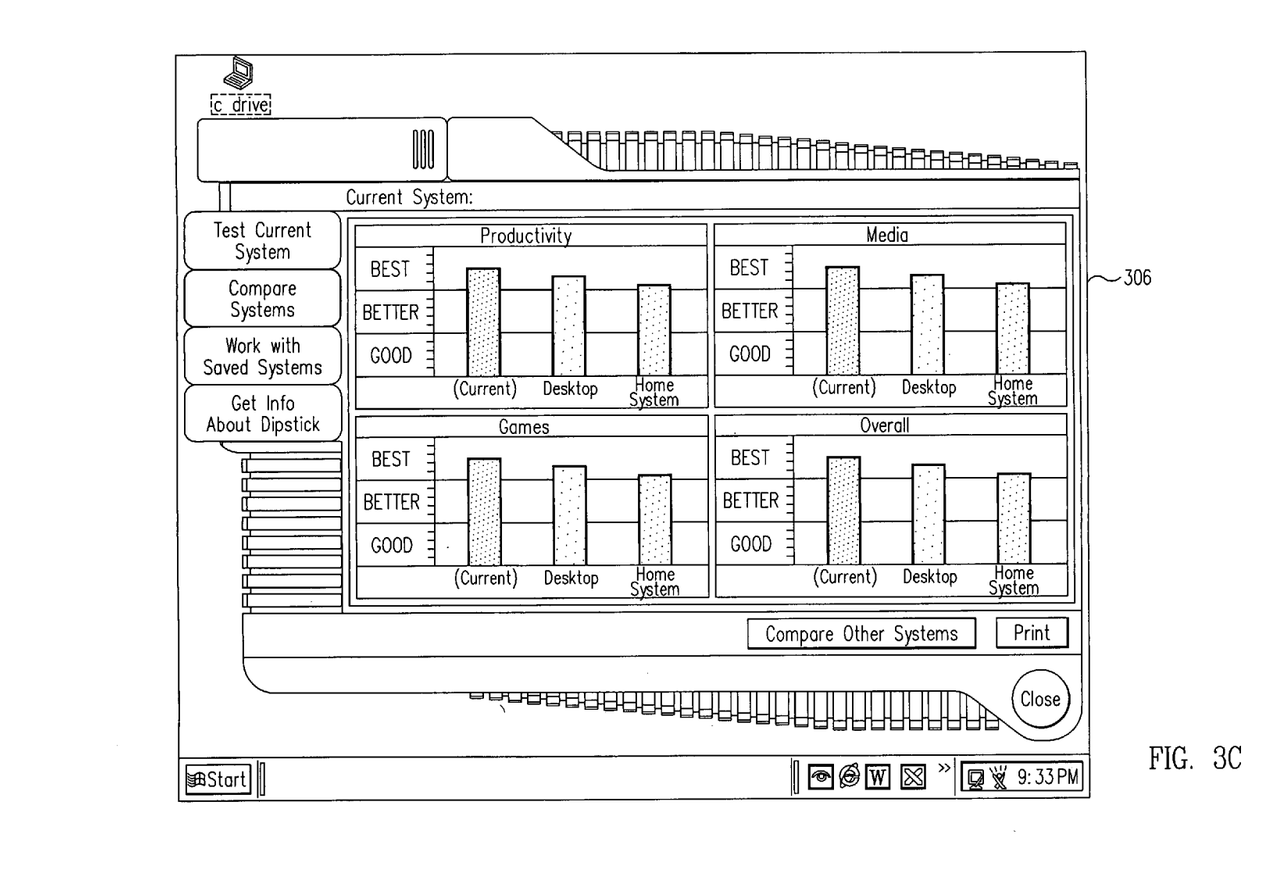
Figure 3D:
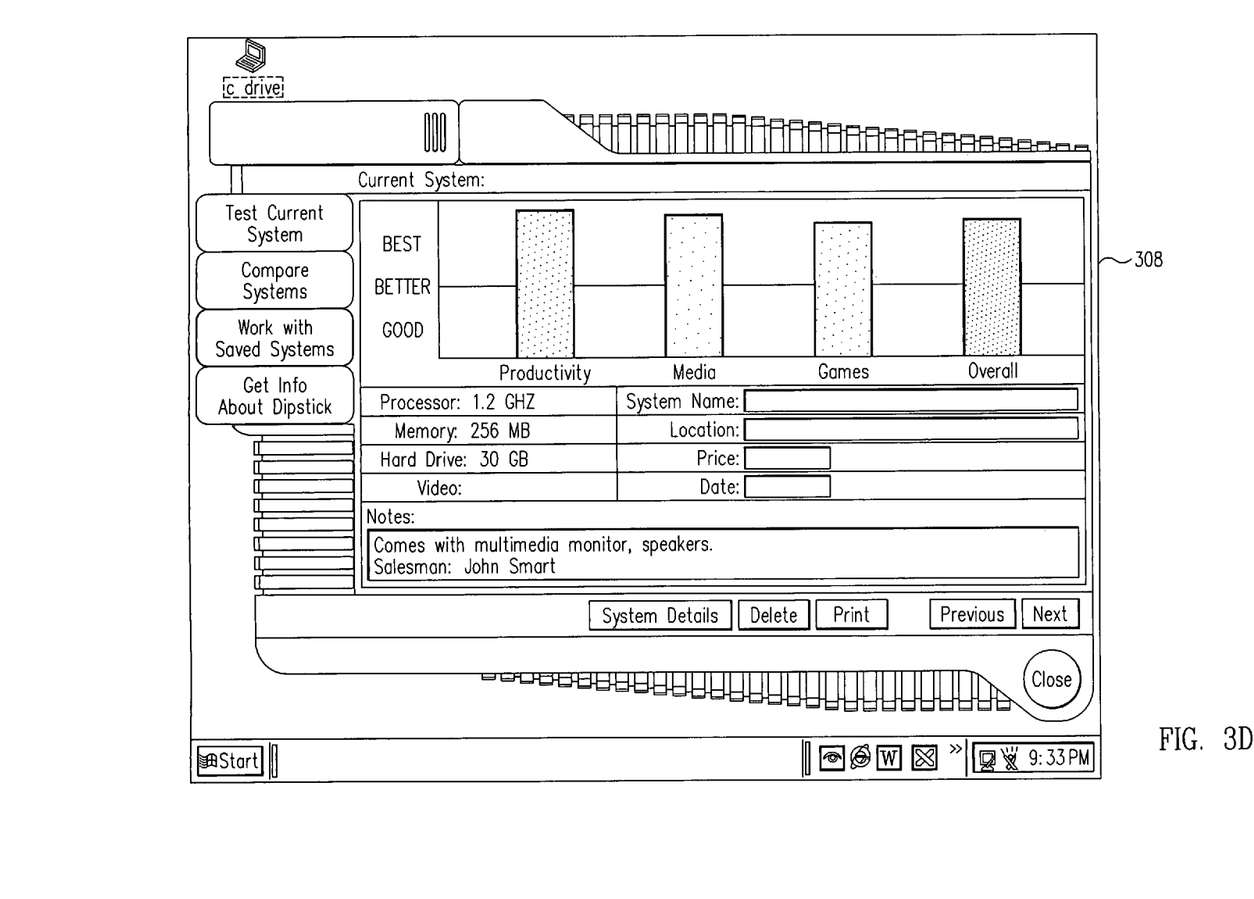
Figure 3E:
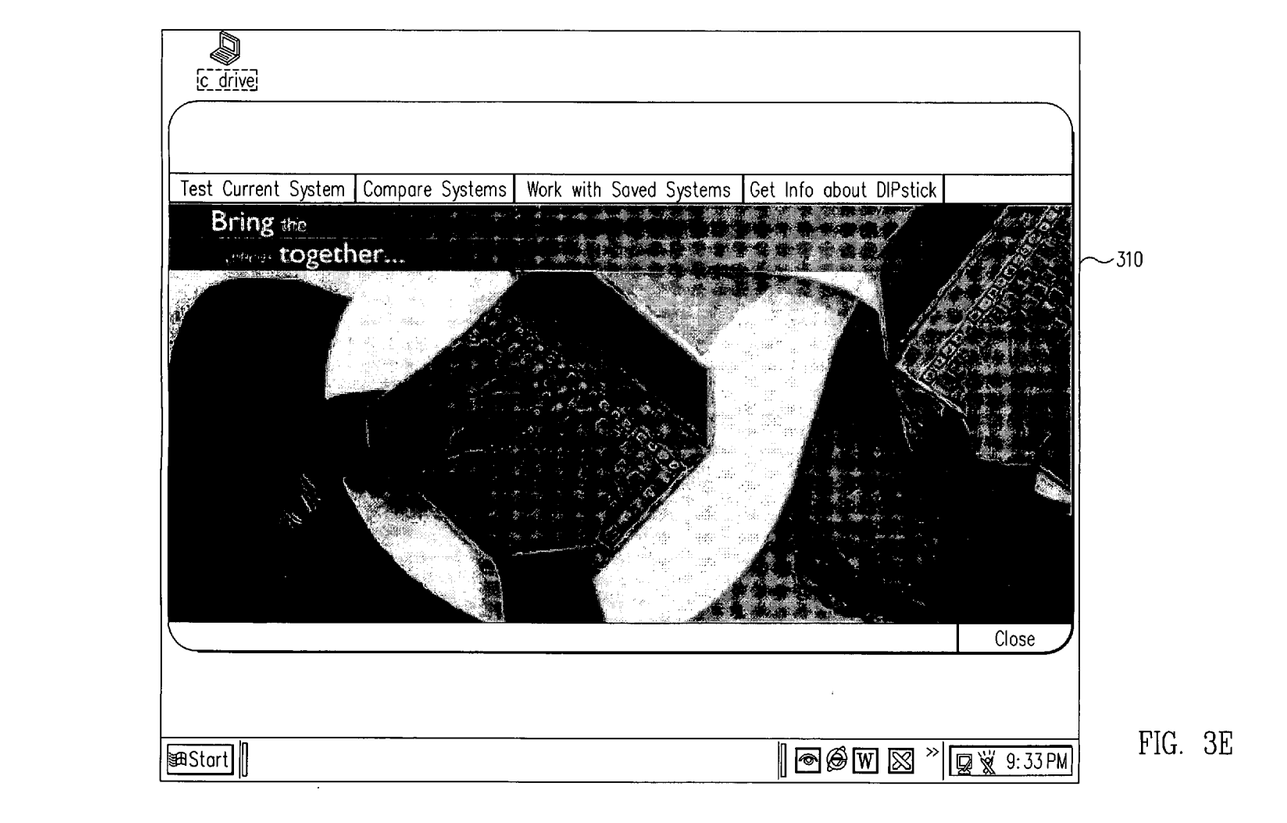
Figure 3F:
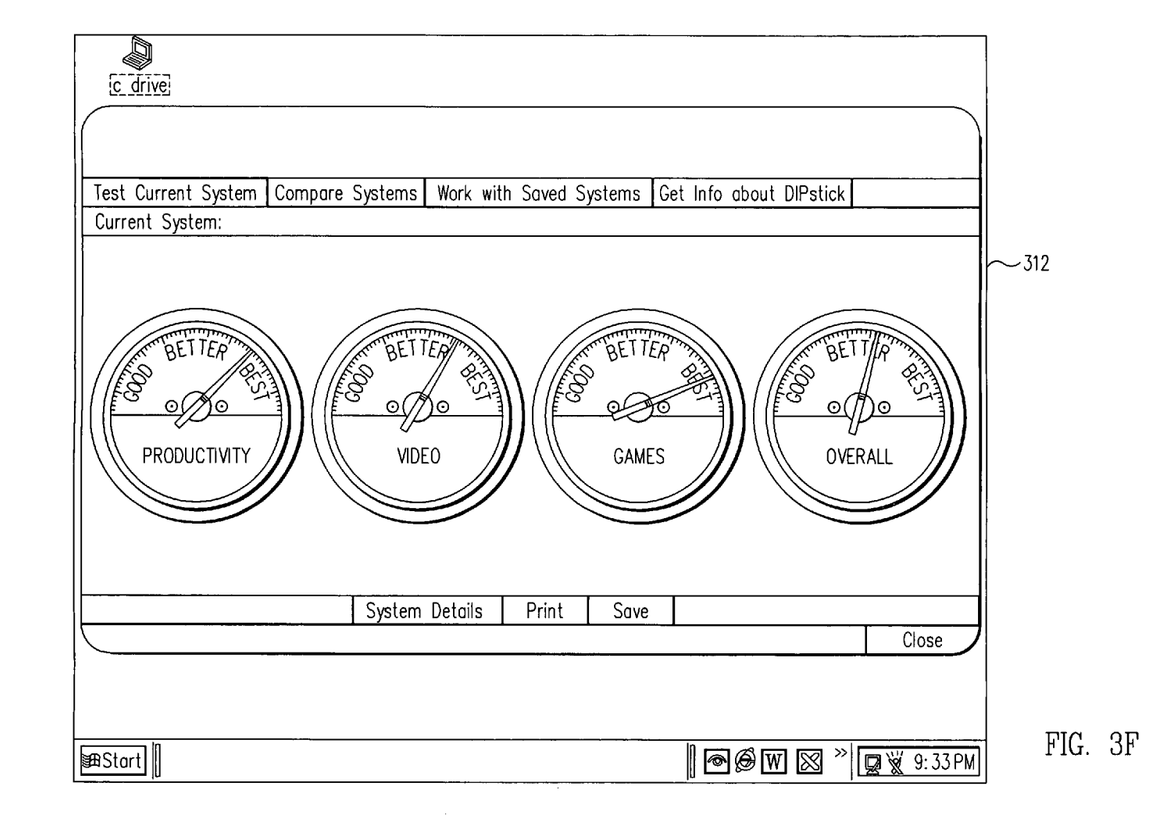
Figure 3G:
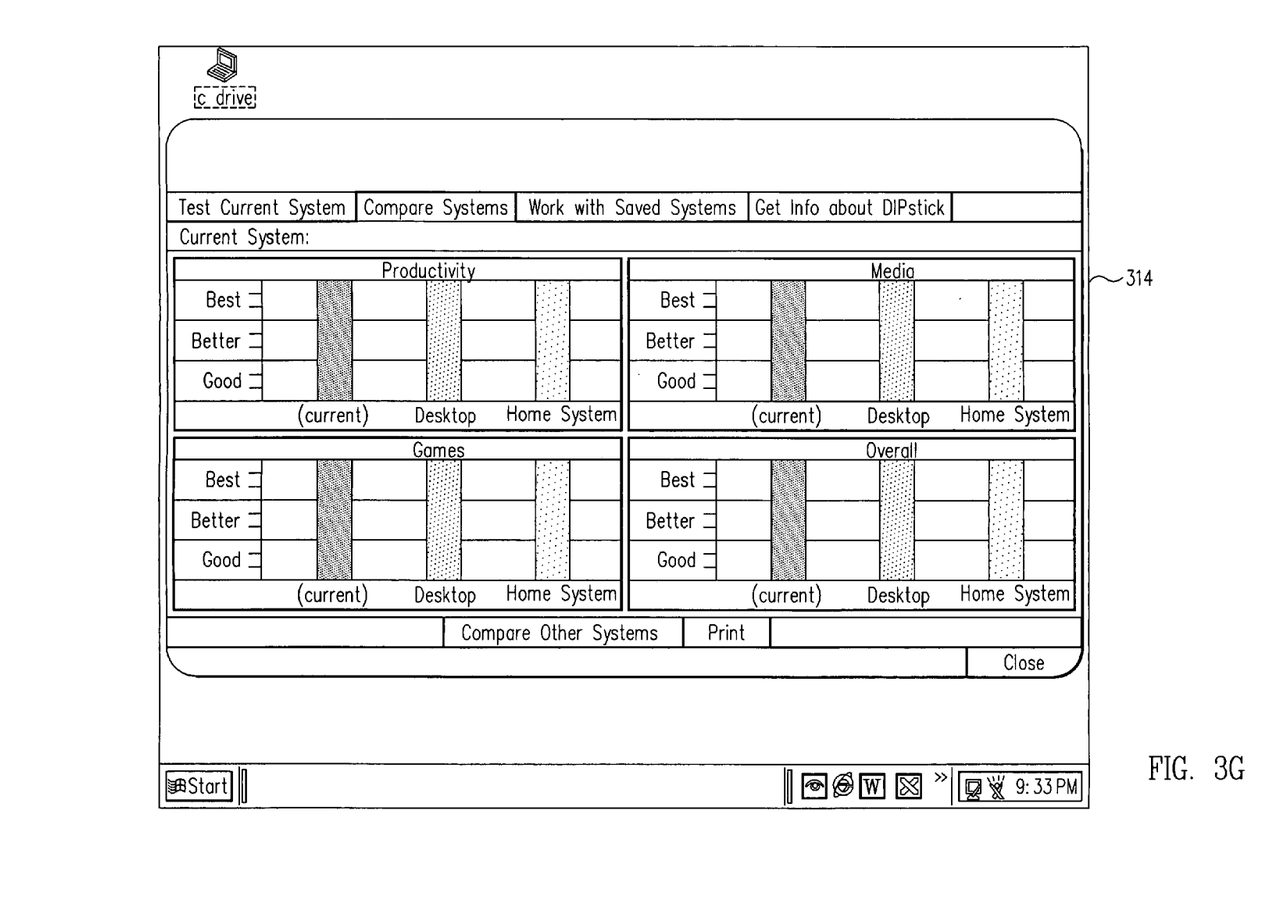
Figure 3H:
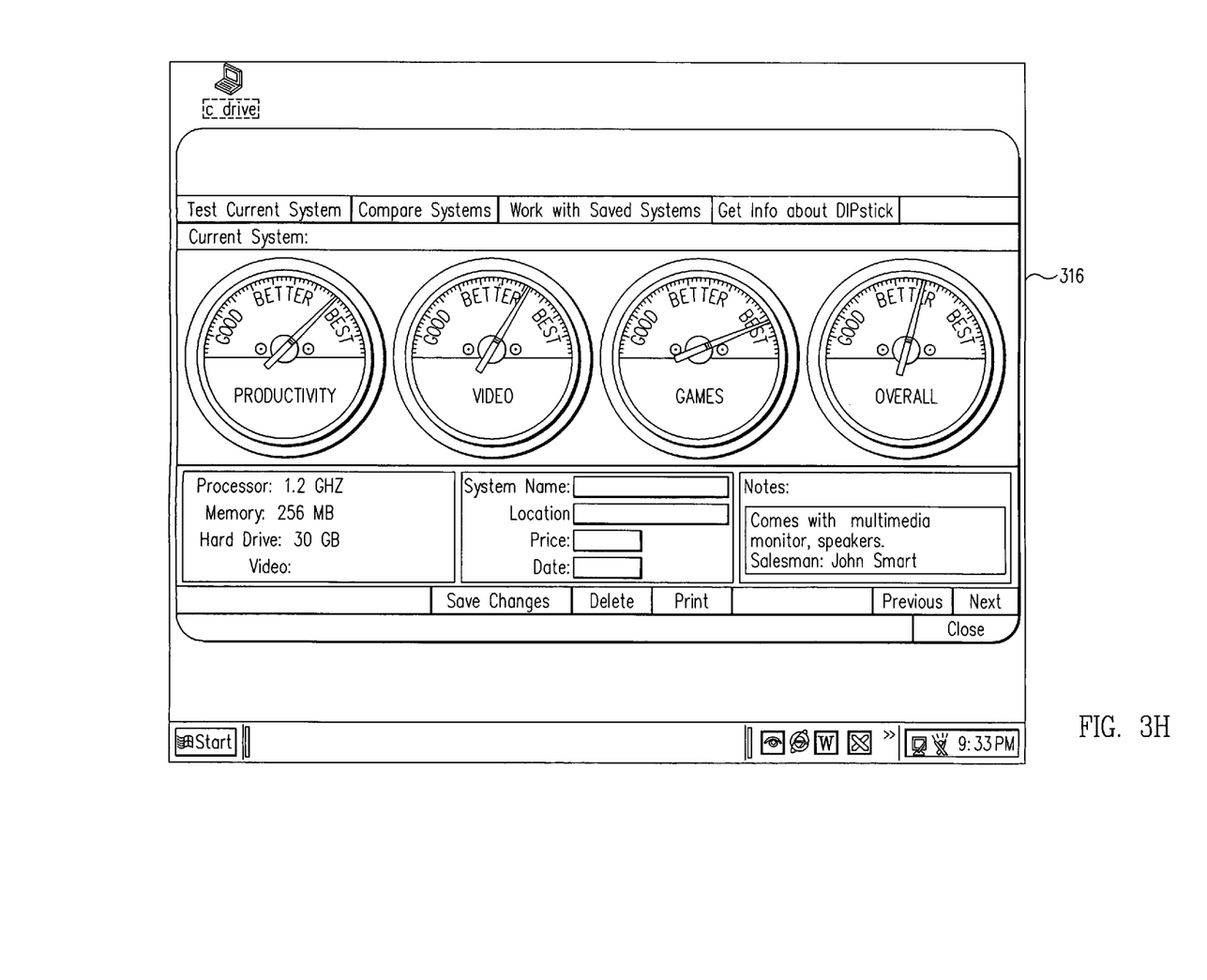

FIGS. 3A–3H illustrate exemplary screen shots of a computer system display according to some embodiments of the invention. As illustrated in FIG. 3A, an exemplary initial presentation of a GUI 302 is illustrated. GUI 302 gives a user such options as test the current computer system, compare systems (for example, the stored performance results of previously tested systems), work with saved performance results of other computer systems, or get information about the portable benchmark device (labeled PC DipStick). An exemplary screen shot 304 of performance results of a current computer system (one currently attached) is illustrated in FIG. 3B. An exemplary screen shot 306 of the comparison of performance results from multiple computer systems is illustrated in FIG. 3C. An exemplary screen shot 308 of performance results of a current computer system which also includes computer system characteristics and comments is illustrated in FIG. 3D. Another exemplary initial presentation of a GUI 310 is illustrated in FIG. 3E. Another exemplary screen shot 312 of performance results of a current computer system is illustrated in FIG. 3F. Another exemplary screen shot 314 of the comparison of performance results from multiple computer systems is illustrated in FIG. 3G. Another exemplary screen shot 316 of performance results of a current computer system which also includes computer system characteristics and comments is illustrated in FIG. 3H.

Figure 4:
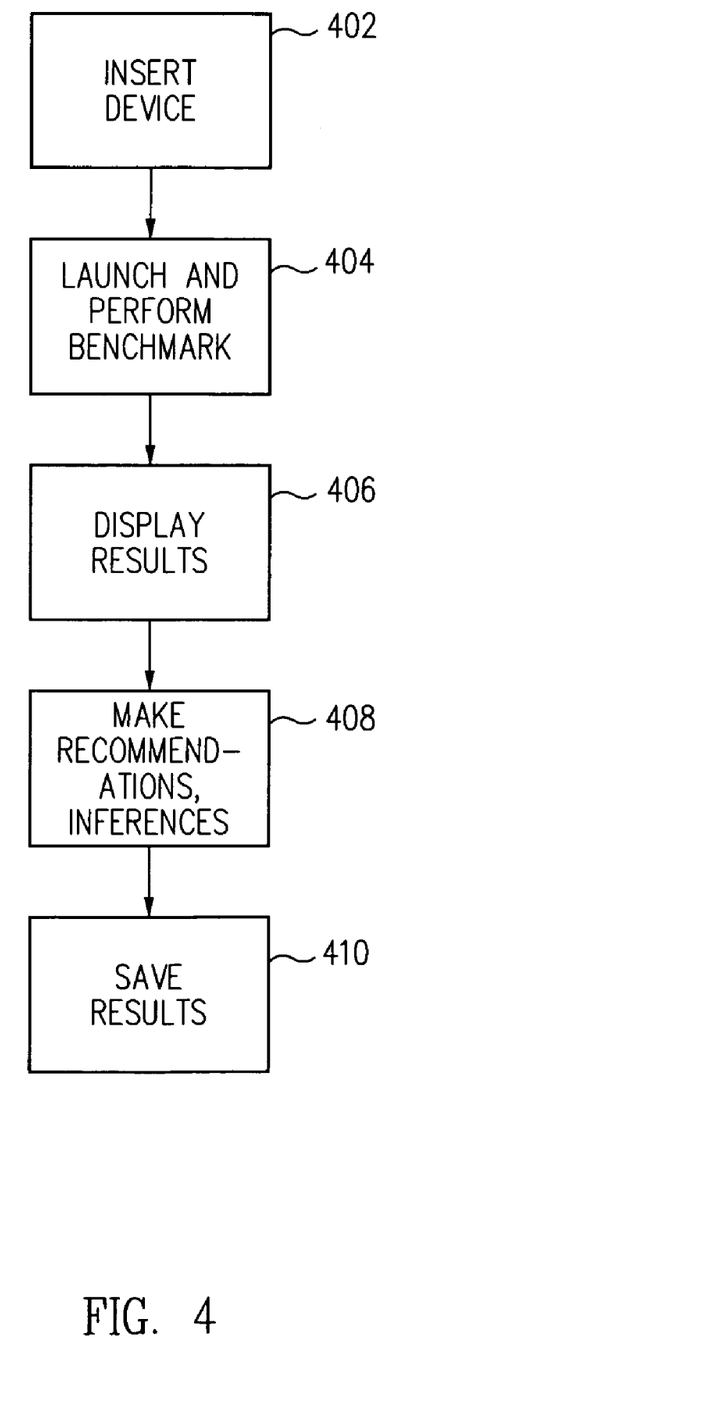
FIG. 4 illustrates a flow diagram illustrating the operation of a portable benchmark device according to various embodiments of the invention.

FIG. 4 illustrates a flow diagram illustrating the operation of a portable benchmark device according to some embodiments of the invention. A portable benchmark device is inserted into or attached to a computer system, step 402. A benchmark routine is launched, step 404. The benchmark routine can be an automatically executed or launched by a GUI with user interaction. The benchmark measures or predicts the computer system's performance and calculates a performance score and other results. The performance results are displayed, step 406. The performance score can be displayed on an LCD display on the portable benchmark device or on the display of the computer system. In addition, comparisons to results of other computer systems can be displayed. Recommendations can be made, step 408. In addition, inferences can be made based on types of computer systems tested, etc. The performance results can be saved to the storage medium on the portable benchmark device, step 410. Alternatively, if an internet connection is available; results can be emailed to a consumer's email account or other location. Saved results can be used for future reference or for comparison with results from other computer systems.

According to one embodiment of the present invention, portable benchmark devices can be distributed to consumers, for example, free of charge. The consumers can perform a benchmark routine on their own computer system, and also take the device to a retail store and perform the benchmark routine on multiple computer systems. Thus, a true performance comparison can be made between multiple computer systems. A consumer can have confidence in the results and make better purchasing decisions. Because the portable benchmark device is non-intrusive, computer systems in retail stores are not affected and the portable benchmark device can be safely used on display models.

Thus, the flows described herein, the operations thereof and modules therefore may be executed on a computer system configured to execute the operations of the flows and/or may be executed from computer-readable media such as storage media 102 and 152. The flows may be embodied in a machine-readable and/or computer-readable medium for configuring a computer system to execute the flows.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A benchmarking apparatus comprising:
   an interface for removably coupling the benchmarking apparatus to a computer system, wherein the benchmarking apparatus receives power via the interface and does not include a power source;

a storage medium coupled to the interface; and
software instructions stored on the storage medium, the software instructions configured to:
determine a performance result of the computer system; and
report the performance result.

2. The benchmarking apparatus, as recited in claim 1, wherein the storage medium is non-removable from the benchmarking apparatus.

3. The benchmarking apparatus, as recited in claim 1, wherein the interface includes an industry standard computer port.

4. The benchmarking apparatus, as recited in claim 1, wherein the software instructions are further configured to launch an interactive software routine on a display of the computer system in which a user can initiate the software instructions configured to determine the performance result of the computer system.

5. The benchmarking apparatus, as recited in claim 1, wherein to determine the performance result, a benchmark routine is loaded onto the computer system through the interface and the benchmark routine is executed by the computer system.

6. The benchmarking apparatus, as recited in claim 5, wherein the benchmark routine is automatically loaded onto the computer system upon coupling the benchmarking apparatus to the computer system.

7. The benchmarking apparatus, as recited in claim 6, wherein to automatically load the benchmark routine, the benchmarking apparatus identifies itself to an operating system of the computer system as a CD-ROM, causing the operating system to automatically execute one or more software routines stored on the storage medium.

8. The benchmarking apparatus, as recited in claim 1, wherein the performance result is reported on a display of the computer system.

9. The benchmarking apparatus, as recited in claim 1, wherein the performance result is reported on a display on the benchmarking apparatus.

10. The benchmarking apparatus, as recited in claim 1, wherein the interface includes a universal serial bus (USB) port.

11. The benchmarking apparatus, as recited in claim 1, wherein the interface includes a parallel port.

12. The benchmarking apparatus, as recited in claim 1, wherein to determine the performance result of the computer system, the software instructions are configured to identify configuration details of the computer system and calculate the performance result using the configuration details.

13. The benchmarking apparatus, as recited in claim 1, wherein to determine the performance result of the computer system, the software instructions are configured to:
calculate the performance result based on an amount of time the computer system takes to complete a software routine loaded on the computer system from the benchmarking apparatus.

14. The benchmarking apparatus, as recited in claim 1, further comprising a storage capability on the storage medium for storing multiple performance results.

15. The benchmarking apparatus, as recited in claim 14, wherein the software instructions are further configured to compare and display the multiple performance results.

16. The benchmarking apparatus, as recited in claim 1, wherein the software instructions stored on the storage medium can be updated through the interface.

17. The benchmarking apparatus, as recited in claim 1, wherein the benchmarking apparatus is a handheld device.

18. The benchmarking apparatus, as recited in claim 17, wherein the handheld device is substantially rectangular having a length and a width, wherein the width is less than half the length.

19. The benchmarking apparatus, as recited in claim 17, wherein the handheld device includes a cover for protecting the interface when the benchmarking apparatus is not connected to the computer system.

20. A handheld benchmarking apparatus comprising:
a connector for connecting the handheld benchmarking apparatus to a computer system; and
an elongated housing coupled to the connector, the elongated housing including:
a control circuit for sending and receiving data to and from the computer system through the connector;
a storage medium coupled to the control circuit; and
software instructions stored on the storage medium, the software instructions configured to:
determine a performance result of the computer system;
report the performance result; and
launch an interactive software routine on a display of the computer system to allow a user of the computer system to initiate the software instructions to determine the performance result of the computer system.

21. The handheld benchmarking apparatus, as recited in claim 20, wherein the storage medium is non-removable from the handheld benchmarking apparatus.

22. The handheld benchmarking apparatus, as recited in claim 20, wherein the handheld benchmarking apparatus receives external power only from the connector.

23. The handheld benchmarking apparatus, as recited in claim 20, wherein the connector includes an industry standard computer interface.

24. The handheld benchmarking apparatus, as recited in claim 20, wherein to determine the performance result, a benchmark routine is loaded onto the computer system through the connector and the benchmark routine is executed by the computer system.

25. The handheld benchmarking apparatus, as recited in claim 24, wherein the benchmark routine is automatically loaded onto the computer system upon coupling the handheld benchmarking apparatus to the computer system.

26. The handheld benchmarking apparatus, as recited in claim 25, wherein to automatically load the benchmark routine, the handheld benchmarking apparatus identifies itself to an operating system of the computer system as a CD-ROM, causing the operating system to automatically execute one or more software routines stored on the storage medium.

27. The handheld benchmarking apparatus, as recited in claim 20, wherein the performance result is reported on a display of the computer system.

28. The handheld benchmarking apparatus, as recited in claim 20, wherein the performance result is reported on a display on the handheld benchmarking apparatus.

29. The handheld benchmarking apparatus, as recited in claim 20, wherein the handheld benchmarking apparatus is substantially rectangular having a length and a width, wherein the width is less than half the length.

30. The handheld benchmarking apparatus, as recited in claim 20, further comprising a cover for protecting the connector when the handheld benchmarking apparatus is not connected to the computer system.

31. A method comprising:
utilizing a portable benchmark device to obtain a performance result for a computer system wherein the portable benchmark device comprises:
an interface for removably coupling the portable benchmark device to a computer system;
a storage medium coupled to the interface; and
software instructions stored on the storage medium, the software instructions configured to:
determine the performance result of the computer system; and
report the performance result, wherein to determine the performance result a benchmark routine is automatically loaded onto the computer system through the interface upon coupling the portable benchmark device to the computer system and the benchmark routine is executed by the computer system.

32. The method, as recited in claim 31, wherein the software instructions are further configured to launch an interactive software routine on a display of the computer system in which a user can initiate the software instructions configured to determine the performance result of the computer system.

33. The method, as recited in claim 31, wherein to automatically load the benchmark routine, the portable benchmark device identifies itself to an operating system of the computer system as a CD-ROM, causing the operating system to automatically execute one or more software routines stored on the storage medium.

34. The method, as recited in claim 31, wherein the performance result is reported on a display of the computer system.

35. The method, as recited in claim 31, wherein the performance result is reported on a display on the portable benchmark device.

36. The method, as recited in claim 31, wherein to determine the performance result of the computer system, the software instructions are configured to identify configuration details of the computer system and calculate the performance result using the configuration details.

37. The method, as recited in claim 31, wherein to determine the performance result of the computer system, the software instructions are configured to:
calculate the performance result based on an amount of time the computer system takes to complete a software routine loaded on the computer system from the benchmarking apparatus.

38. The method, as recited in claim 31, further comprising a storage capability on the storage medium for storing multiple performance results.

39. The method, as recited in claim 38, wherein the software instructions are further configured to compare and display the multiple performance results.

40. The method, as recited in claim 31, wherein the software instructions stored on the storage medium can be updated through the interface.

41. A method for aiding a consumer in determining the performance of one or more computer systems, the method comprising:
providing the consumer with a portable benchmark device that includes an interface for removably coupling the benchmarking apparatus to a computer system, a storage medium coupled to the interface, and software instructions stored on the storage medium, the software instructions configured to determine a performance result of the computer system and report the performance result, wherein to determine the performance result of the computer system the software instructions are configured to identify configuration details of the computer system and calculate the performance result using the configuration details.

42. The method, as recited in claim 41, wherein the storage medium is non-removable from the portable benchmark device.

43. The method, as recited in claim 41, wherein the portable benchmark device receives external power only from the interface.

44. The method, as recited in claim 41, wherein the interface includes an industry standard computer port.

45. The method, as recited in claim 41, wherein the performance result is reported on a display of the computer system.

46. The method, as recited in claim 41, wherein the performance result is reported on a display on the portable benchmark device.

47. The method, as recited in claim 41, wherein to determine the performance result of the computer system, the software instructions are configured to:
calculate the performance result based on an amount of time the computer system takes to complete a software routine loaded on the computer system from the benchmarking apparatus.

48. The method, as recited in claim 41, wherein the software instructions stored on the storage medium can be updated through the interface.

* * * * *